United States Patent [19]

Erlichman

[11] 4,008,302

[45] Feb. 15, 1977

[54] METHOD OF MOLDING PLASTIC ELEMENTS ON A CONTINUOUS WEB

[75] Inventor: Irving Erlichman, Wayland, Mass.

[73] Assignee: Polaroid Corporation, Cambridge, Mass.

[22] Filed: Dec. 26, 1972

[21] Appl. No.: 318,003

[52] U.S. Cl. ................................ 264/156; 29/407; 264/401; 264/251; 264/297; 264/334; 425/DIG. 34

[51] Int. Cl.² .......................................... B29D 7/08

[58] Field of Search .......... 264/251, 254, 154, 132, 264/156, 297; 425/DIG. 34

[56] References Cited

UNITED STATES PATENTS

| | | | |
|---|---|---|---|
| 2,569,083 | 9/1951 | Wilhelm | 264/328 |
| 2,714,949 | 8/1955 | Morin | 425/DIG. 34 |
| 2,744,289 | 5/1956 | Wanders | 264/251 |
| 2,965,932 | 12/1960 | Knowles | 264/251 |
| 2,971,249 | 2/1961 | Anderson et al. | 29/625 |
| 3,122,598 | 2/1964 | Berger | 264/247 |
| 3,192,298 | 6/1965 | Fisher | 264/255 |
| 3,549,858 | 12/1970 | Larive | 264/154 |
| 3,655,308 | 4/1972 | Kutik et al. | 264/212 |

Primary Examiner—Robert F. White
Assistant Examiner—James B. Lowe
Attorney, Agent, or Firm—Sheldon W. Rothstein; Susan M. Cooke; Esther A. H. Hopkins

[57] ABSTRACT

A continuous web of identical plastic parts is produced by molding a first unit comprising at least one of such parts in a mold, and connecting such molded part(s) to subsequent molded parts, by means of at least one runner upon which all the parts comprising the web are molded. The runner(s) connecting the parts may include indicia of data such as, indexing, information, part treatment information, assembly information, inventory information, etc.

8 Claims, 5 Drawing Figures

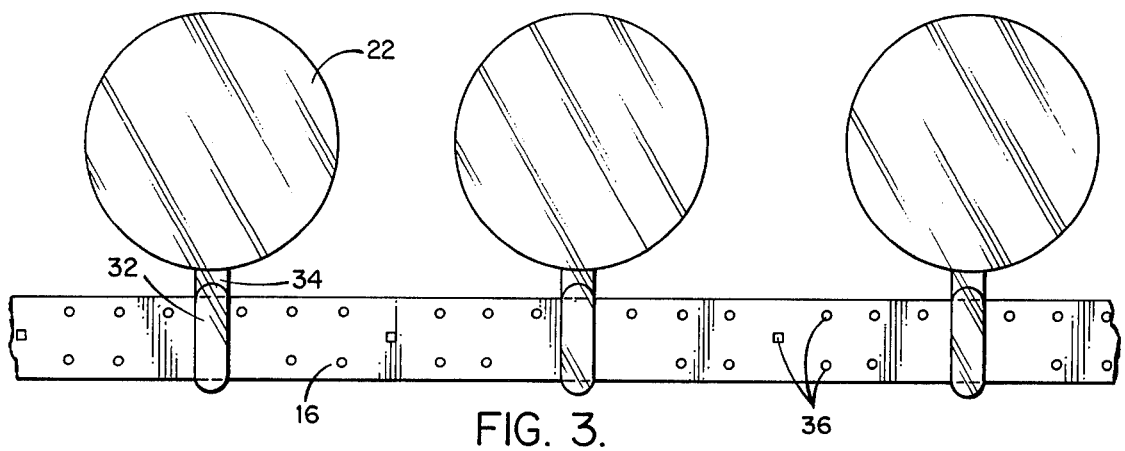
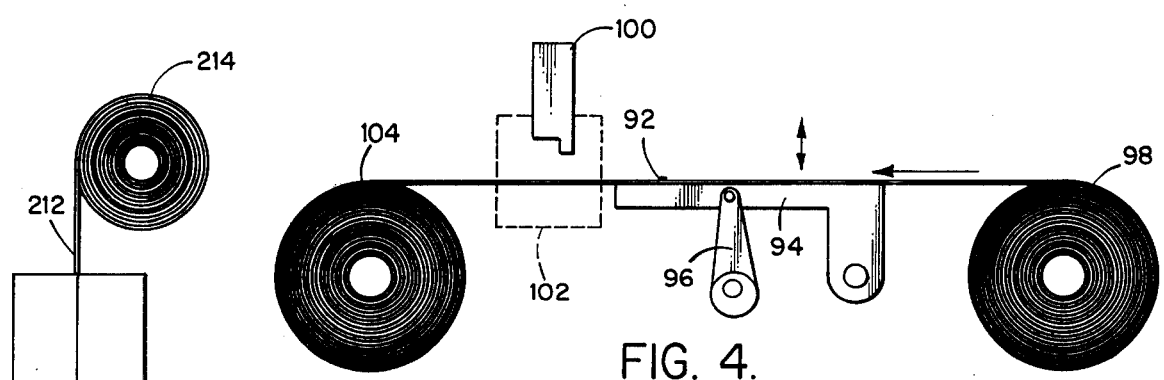
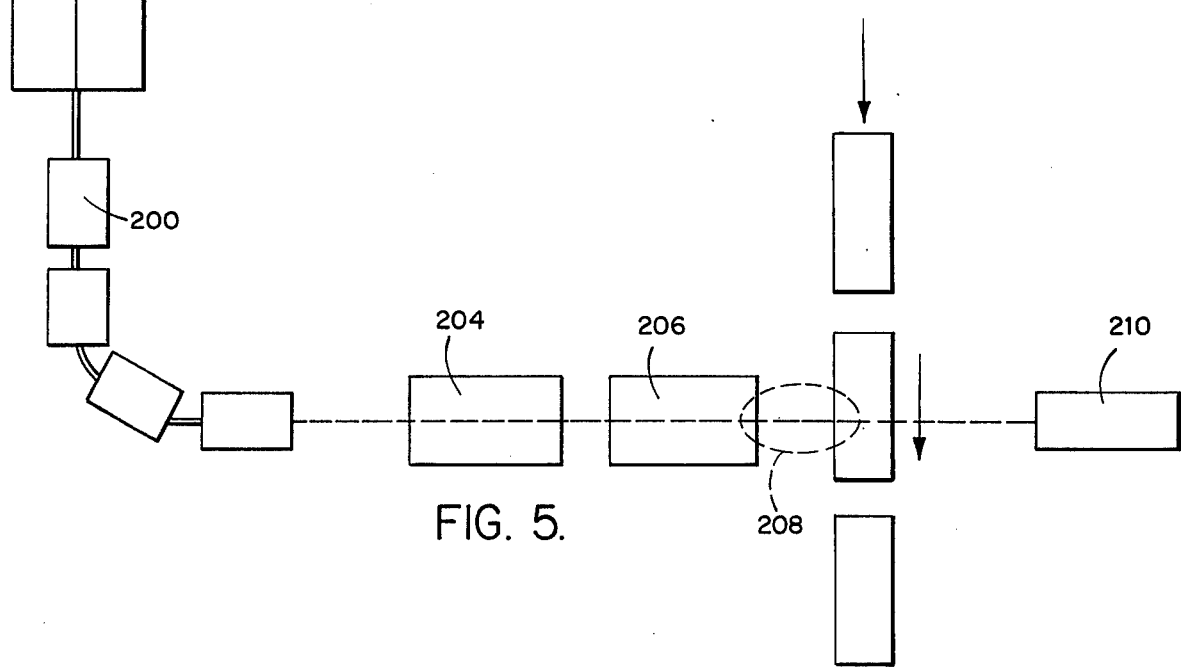

METHOD OF MOLDING PLASTIC ELEMENTS ON A CONTINUOUS WEB

BACKGROUND OF THE INVENTION

This invention relates to a procedure for the molding of a succession of identical plastic parts in the form of a continuous web in which the parts are spaced from one another and secured to at least one continuous runner. The invention further relates to techniques for providing integral data storage on such continuous web which, among other things, may provide a stimulus to automatic assembly equipment to perform operations on the parts as, for example, severing the individual plastic parts from the web and positioning them into subassemblies to form composite products in an assembly line operation.

Automatic assembly line techniques for assembling a plurality of different components into a single composite product are well known. However, in most automatic assembly operations, it is very difficult to index and transport parts which are lightweight, and/or small, and/or have complex configurations. Plastic parts of this nature do not lend themselves to storage in hoppers, and thus present special problems in their transportation and use in automatic assembly operations, though the present invention is considered equally applicable to, and simplifies, the assembly of large parts. In addition, by the instant invention automatic operations may be "programmed" by waste product of a continuous web of molded plastic parts.

SUMMARY OF THE INVENTION

It is a primary object of the present invention to provide an improved procedure for the molding of plastic parts in the form of a continuous web, and the subsequent assembling of these parts with one or more other parts or subassemblies.

Another primary object of the present invention is to provide a novel method and apparatus for molding a web comprising a plurality of plastic parts which are joined to each other by a continuous runner which, in essence, forms part of the mold, with subsequent parts being produced by molding them onto subsequent portions of the runner, and wherein integral data storage propensity is provided by the runner.

Still another object of the invention is to provide improved apparatus for molding a web comprised of a series of discrete, identical parts and for withdrawing the web from a mold without contacting and distorting the parts.

In accordance with the present invention, a plurality of identical plastic parts are produced by molding at least one such part in a mold which produces the part molded upon a runner which is capable of providing ejection stimulus to the part(s) and results in a continuous web. This is accomplished by extending a continuous runner through the mold, such runner being capable of having molded parts secured thereto. The runner might comprise a tape of paper; plastic, such as Mylar; metal; magnetic tape; etc. and may comprise prestored information or might have information imparted to it by the mold. The term "runner" as employed herein connotes any tape-like or other scrap portion employed during molding which is not a component of the molded part, or parts, and is provided to the mold from a continuous source. After each molding operation, the mold is opened and the just-formed unit is transported therefrom by means of the runner. Ideally a gripper system will be employed to impart ejection stimulus to the molded parts by sequentially gripping and advancing the runner a predetermined distance. In removing the just-molded unit from the mold, only the runner is contacted by the mechanism for advancing the molded unit thereby substantially eliminating the possibility of deforming the individual parts.

As aforenoted, the runner(s) will preferably be used for data-storage purposes. It will also preferably contain perforations in areas which contact the molded element so that the molded elements positional relationship with the data-storage areas of the runner will remain precise due to the retention of cured material in the perforations. This is particularly critical in cases where the runner data serves to index the molded parts, for example.

Data may be imparted to the runner material prior to the molding operation or it may be accomplished, for example, as a function of mold closure wherein mold-integral pins might perforate the web and provide deformations for subsequent reading by a suitable detector capable of translating the perforations into appropriate physical actions. The molded parts connected by the runner may be wound and stored or immediately directed toward an automatic assembly, or other, station.

At such time as the connected parts are to be acted upon as, for example, by being incorporated into a multipart assembly, the web comprising such parts may be engaged by an indexing mechanism under stimulation by runner-stored data to accurately position a single part relative to an assembly point, the indexing system providing functionality which spatially defines the position and orientation of the molded part. The indexed molded product is then preferably acted upon by means including gauging means which is capable of sensing any deformities in a molded part and eliminating any parts falling outside predetermined tolerances. The forwardmost component may be indexed, positioned at an assembly station and severed from the runner and molded waste almost simultaneously. In a totally in-line system, for example, the rate of production of the molded components and concomitant feed of the components to an assembly station will be correlated with the assembling operation so that the molded parts reach the assembly station at the same rate that the components are joined to respective subassemblies to produce a composite multipart product. In such a continuous molding-assembly system, a suitable catenary will be maintained by the web to allow for rejection of defective parts and provide a margin for error. It is preferred, however, that the web parts be wound and stored in roll form until needed. At that time, the web may be unrolled and index data may be used in conjunction with index means to position the forward end of the web at an assembly station substantially as described above.

The above and other objects, features and advantages of the invention will become more apparent as this description proceeds.

BRIEF DESCRIPTION OF THE DRAWINGS

FIG. 3 is a top view of a typical continuous web of molded parts produced by the present invention with a single runner carrying data in a form capable of stimulating automatic devices to act on the molded parts;

FIG. 4 is a typical apparatus capable of employing the web of the present invention in an assembly system and schematically depicts the collection of waste material and severing a desired part from the web; and FIG. 5 is a schematic drawing typifying the utilization of a continuous web of molded parts produced by the present invention in an assembly system.

DETAILED DESCRIPTION OF THE INVENTION

Figure 1:
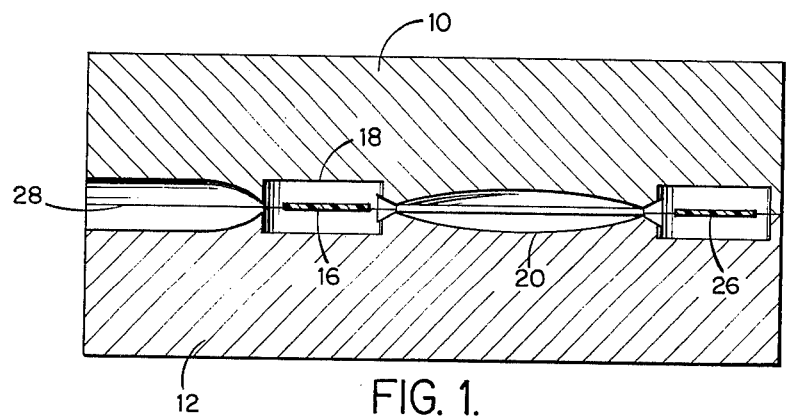
FIG. 1 is a cross-sectional top view of a mold which may be employed in manufacturing a continuous web of parts according to the present invention showing two continuous runner elements in place.

Referring now to FIG. 1 of the drawings, a top sectional view of a suitable mold capable of performing the method of the present invention is depicted. The mold comprises two primary components 10 and 12, at least one of which is capable of being moved in the plane of the paper away from the other to enable the molded part to be ejected. Taken together, the mold comprises a nozzle 28 through which resinous material may be fed to the internal cavity defined by the mold halves. The cavity denoted by reference numeral 20 generally defines the configuration of the ultimately desired molded part. It is connected to the nozzle area by means of a secondary cavity 18 through which a continuous runner 16 may be drawn and about which a molded element may be formed. A similar cavity and runner 26 is depicted on the opposed side of cavity 20.

Figure 2:
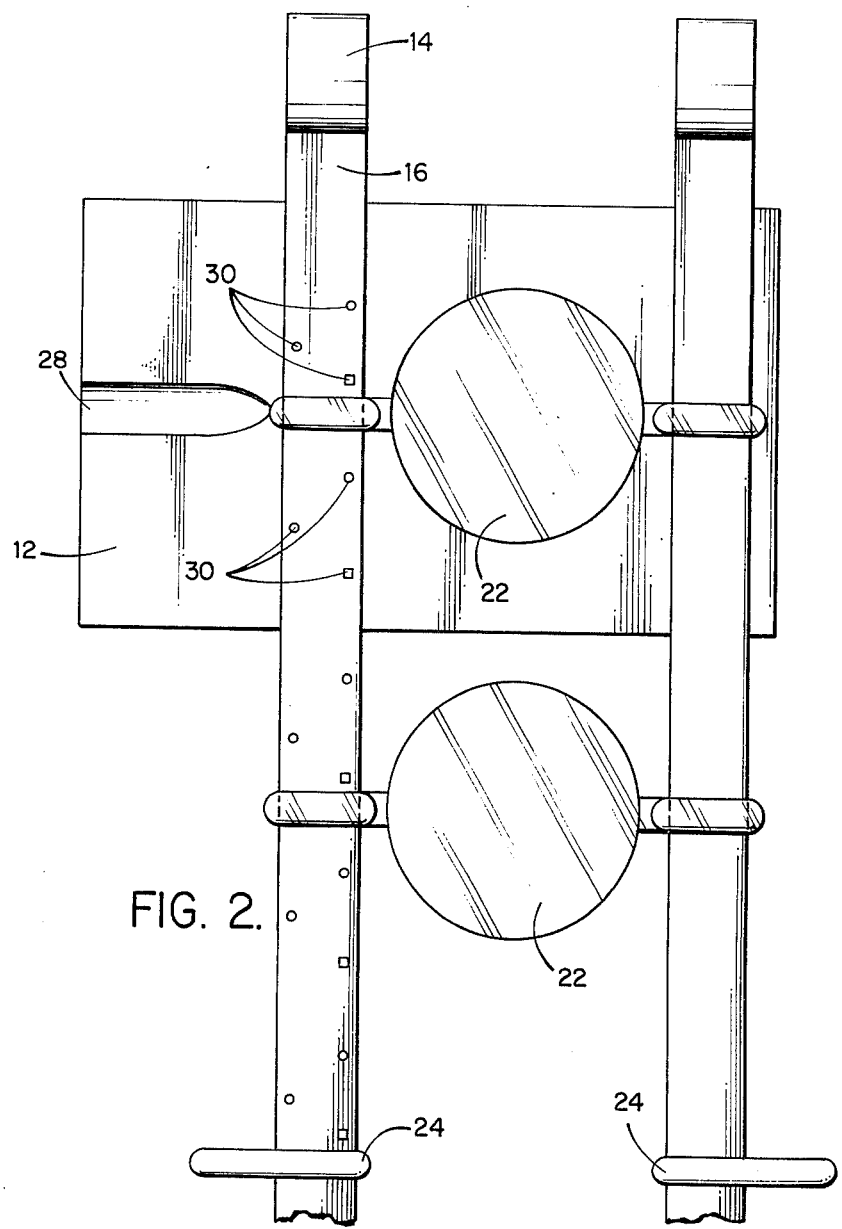
FIG. 2 is a diagrammatic side view of the mold of FIG. 1 shown with a molded part in residence and runner feed means.

Referring now to FIG. 2, a partial side sectional view of the mold of FIG. 1 is depicted having part of a continuous web of molded elements positioned therein, including mold component 12 with integral nozzle 28 capable of directing a liquid resinous material into the internal cavity of the mold. The resinous material fills the cavity 18 through which runner 16 traverses and the cavity 20 in which part 22 is depicted in residence. In this figure, runner 16 is shown as comprising a continuous web fed from roll 14 and comprises the means by which the molded part 22 is ejected from the mold with the aid of grippers 24. In operation, resinous material is injected into the mold through nozzle 28 and permitted to cure in the internal mold cavity about runner 16 and, in this embodiment, about runner 26. Upon completion of the molding cycle, the mold components are parted by moving them in directions normal to the plane of the paper. Upon separation of the mold components, grippers 24 eject the molded element by drawing the runners a predetermined distance. After ejection the mold is closed and the cycle repeated. Prior to entrance into the mold, runner 16 may have information indicia imparted to it, such being, for example, magnetic, physical deformation, etc. In the case of physical deformation indicia, such may be imparted to the runner by mold-integral means which deform the runner upon mold closure as shown, for example, at 30. This establishes a precise spatial relationship between the molded part and the indicia.

Referring now to FIG. 3, a typical single runner continuous web 16 comprising molded parts 22 is shown. Molded component 32 is secured during molding to web 16 and is ultimately severed from part 22 at neck 34. Various information is denoted by indicia 36 which may control automatic part indexing, severing, and assembly, etc.

The molded parts may be employed either in an on-line molding-assembly system, or a continuous web may be stored and subsequently used for assembly. With respect to FIG. 4, a continuous web comprising molded parts 98, formed as described above, is unwound and fed along platform 94 which is capable of being rotated slightly under the stimulus of cam element 96. Detector station 92 reads the stored runner information and positions the desired molded part precisely with respect to cutting element 100 at assembly station 102. In response to stored runner information stimulation the detector station 92 activates cutting element 100 and assembly station 102 to sever the molded part and associate it with a subassembly. The waste runner is then rolled up at 104 and the part, now assembled into a total system, is caused to move in the direction normal to the figure whereupon another subassembly takes its place and the sequence repeats itself. Suitable severing and assembly equipment is well known to the art. For a detailed discussion of a preferred system, reference is made to the apparatus described in FIGS. 5 through 7 of U.S. patent application of Irving Erlichman, Ser. No. 318,417, filed on the same day as the instant application.

It will be readily appreciated that the molding technique of the present invention may be directly correlated with an assembly system to provide in-line molding and assembly of components. This may be visually appreciated with respect to FIG. 5 wherein a continuous molded web 200, formed as hereinabove described by successive injection molding operations within a mold 202, on runner 212, unwound from roll 214, is passed to a suitable detection station 204 which reads the information stored on the runner. The detection station may be one of a number of conventional systems and may, among other things, be capable of detecting whether or not an individual part is within or without tolerances. In the case of a part outside predetermined tolerances, it may be disposed of prior to assembling and the assembly system may be delayed for a predetermined duration until a suitable part arrives at the active assembly nest. Based upon information received by the detection station and stimuli achieved thereby, the molded parts may advance to an index station 206 which precisely positions the part for insertion into the assembly nest. Subsequent to or forming a part of the index station 206 is a positioning and severing station 208, where the part is positioned in an assembly nest travelling on a conveyor preferably normal to the direction of the part web movement and is severed from the web, the resultant runner being collected at waste collection station 210. In the scheme of FIG. 5, it is preferable to provide at some point between the molding station and the assembly station a catenary in the web which allows for reject removal and takes into account speeding up or slowing down of the molding vis-a-vis the assembly systems. Severing the desired part from the runner and remaining components may be accomplished in any conventional manner as, for example, by a knife, punch, hot rotating wire, etc. Once the part is assembled into the subassembly, the nest is moved in the direction of the arrow, generally normal to the movement of the web, and another subassembly is positioned in its place to receive the next part. Conceivably, a single assembly station may be fed by more than one molding station. For example, when the material being molded is Delrin or Nylon, a molding cycle of about six seconds is suitable. Assuming for purposes of illustration that parts should be fed to the assembly station at a rate of one every two seconds, then three molding systems would be designed to feed the assembly station at an appropriate sequence so that three assemblies will be produced for every six-second period.

While the presently preferred embodiments of the invention have been shown and described with particularity, it will be appreciated that various changes and modifications may readily suggest themselves to those of ordinary skill in the art upon being apprised of the present invention. It is accordingly intended to encompass all such changes and modifications as may fall within the scope and spirit of the appended claims.

I claim:

1. A method for forming a continuous web comprising plastic molded elements comprising:
    inserting into a mold comprising a cavity a forward portion of at least one continuous runner element;
    causing a section of said runner element to traverse a part of the mold cavity and protrude from the mold;
    injecting into the mold cavity a liquid material capable of being cured to form a solid;
    curing said liquid material in said mold cavity whereby the cured material is secured to the runner section in said mold cavity;
    opening said mold and applying sufficient force to said runner to cause the molded part secured thereto to be ejected from the mold;
    concomitantly positioning a subsequent portion of said continuous runner element in said cavity; and
    closing the mold and repeating the molding and ejection cycle whereby a web comprising molded plastic parts secured to at least one continuous runner element is formed.

2. The invention of claim 1 wherein said runner comprises a continuous paper web.

3. The invention of claim 1 wherein said runner comprises a continuous plastic web.

4. The invention of claim 1 wherein said runner comprises a continuous metallic web.

5. The invention of claim 1 wherein said runner comprises a magnetic tape.

6. The invention of claim 1 wherein said runner comprises stored information capable of detection and stimulating the performance of desired functions at least with respect to said molded parts.

7. The invention of claim 1 wherein indicia of information is imparted to said runner by said mold.

8. The invention of claim 7 wherein said indicia of information is imparted by mold means which perforate the runner during mold closure.

* * * * *